United States Patent [19]

Kikugawa et al.

[11] 3,910,884

[45] Oct. 7, 1975

[54] S-SUBSTITUTED-2-THIOADENOSINES AND PROCESS FOR PRODUCING THE SAME

[75] Inventors: Kiyomi Kikugawa; Hideo Suehiro; Kazuhiro Iizuka; Leiko Sugata; Motonobu Ichino; Tokuro Nakamura, all of Saiki, Japan

[73] Assignee: Kohjin Co., Ltd., Shimba, Japan

[22] Filed: June 19, 1973

[21] Appl. No.: 371,340

[30] Foreign Application Priority Data

June 19, 1972 Japan............................ 47-60464

[52] U.S. Cl............................ 260/211.5 R; 424/180
[51] Int. Cl.²........................................ C07H 19/16
[58] Field of Search............................ 260/211.5 R

[56] References Cited
UNITED STATES PATENTS

| | | | |
|---|---|---|---|
| 3,454,559 | 7/1969 | Yamazaki et al. | 260/211.5 R |
| 3,719,660 | 3/1973 | Imai et al. | 260/211.5 R |
| 3,752,805 | 8/1973 | Maguire et al. | 260/211.5 R |

*Primary Examiner*—Johnnie R. Brown
*Attorney, Agent, or Firm*—Sughrue, Rothwell, Mion, Zinn & Macpeak

[57] ABSTRACT

Novel S-substituted-2-thioadenosines which are useful as a coronary vascular vasodilator and a platelet aggregation inhibitor, a process for producing S-substituted-2-thioadenosines by reacting 2-thioadenosine with a halide represented by the general formula R'X wherein R' is as defined hereinafter, and a coronary vascular vasodilator and platelet aggregation inhibitor comprising at least one S-substituted-2-thioadenosine are disclosed.

8 Claims, No Drawings

S-SUBSTITUTED-2-THIOADENOSINES AND PROCESS FOR PRODUCING THE SAME

BACKGROUND OF THE INVENTION

1. Field of the Invention

The present invention relates to novel S-substituted-2-thioadenosines and to a process for producing the same by reacting a 2-thioadenosine with a halide represented by the general formula R'X. It also relates to a coronary vascular vasodilator and blood platelet aggregation inhibitor.

2. Description of the Prior Art

Heretofore, pharmaceutical effects of S-substituted-2-thioadensosines of this type have not sufficiently been examined due to the difficulty of the production thereof though excellent pharmaceutical effects are expected. In addition, as the process for producing the S-substituted-2-thioadenosines, there is known a process of condensing 2-methyl or ethyl-thioadenine or 2-isopropyl or n-propylthio-6-chloropurine and ribose (M. H. Magurie et al, "Journal of Medicinal Chemistry," Vol. 14, page 415, 1971) or a process of reacting 2-chloroadenosine with a methyl, ethyl, n-propyl or isopropyl mercaptan (ibid; and H. J. Schaeffer & H. J. Thomas, "Journal of the American Chemical Society," Vol. 80, page 3738, 1958). However, these processes involve a number of steps and are too complicated to be practical for producing the title compounds. In the latter process, it is difficult to obtain a corresponding mercaptan, and these compounds having a lower alkyl group do not exhibit a sufficient aggregation inhibition activity on blood platelets. Accordingly, the object of the present invention is to provide a process for producing S-substituted-2-thioadenosines with ease in high yield and to provide S-substituted-2-thioadenosines useful as a coronary vascular vasodilator and platelet aggregation inhibitor.

SUMMARY OF THE INVENTION

The object of the present invention is to provide novel S-substituted-2-thioadenosines and a process for producing the same by reacting 2-thioadenosine with a halide represented by the general formula R'X, wherein R' represents an allyl group, a substituted allyl group, a benzyl group, a substituted benzyl group or a dialkylaminoalkyl group. The resulting S-substituted-2-thioadenosines are useful as a cornonary vascular vasodilator and an aggregation inhibitor for blood platelets.

DETAILED DESCRIPTION OF THE INVENTION

S-substituted-2-thioadenosines in accordance with the present invention are represented by the following general formula;

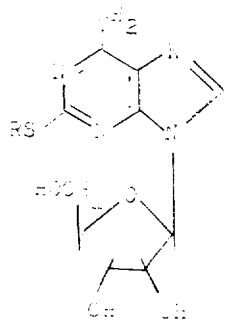

wherein R represents an allyl group, a substituted allyl group, a benzyl group, a substituted benzyl group, or a dialkylaminoalkyl group.

Examples of the substituted allyl group are those having a methyl group at β- or γ-position, and the like. Examples of the substituted benzyl group are a p-chlorobenzyl group, a p-nitrobenzyl group, and the like. Examples of the dialkylaminoalkyl group are a diethylaminoethyl group, and the like.

The present invention also contemplates a process for producing the S-substituted-2-thioadenosines of the present invention which comprises reacting 2-thioadenosine represented by the following structural formula;

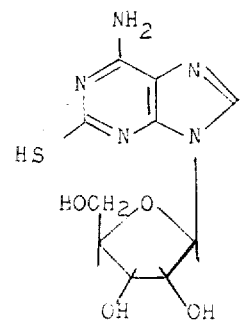

with a halide represented by the general formula;

R'X wherein R' represents an alkyl group having one to four carbon atoms, an allyl group, a substituted allyl group, a benzyl group, a substituted benzyl group or a dialkylaminoalkyl group, in the presence of an alkali.

The halides advantageously used in the invention include methyl iodide, propyl bromide, benzyl bromide, p-chlorobenzyl chloride, p-nitrobenzyl bromide, allyl bromide, diethylaminoethyl chloride, trans-1-chloro-2-butene, β-methallyl chloride, etc.

In carrying out the process of the present invention, 2-thioadenosine is reacted with a halide at a temperature of from 0°C to 100°C in water or an organic solvent in the presence of an alkali.

As the reaction solvent, any solvent may be used as long as it dissolves both 2-thioadenosine and the halide and does not react with the reactants or the product. For example, water or an alcohol can preferably be used.

As the alkali, there are used an alkali metal, an alkali metal hydroxide (e.g., sodium hydroxide, potassium hydroxide, etc.) and organic amines (e.g., pyridine, triethylamine, etc.).

The halide is used in an amount of from equimolar amount to ten-fold molar amount based on 2-thioadenosine. Alkali is used in an amount of from equimolar amount to ten-fold molar excess amount based on 2-thioadenosine, but an equimolar amount is preferred.

The reaction is conducted at a temperature of from 0° to 100°C for a period of from 30 minutes to 100 hours. The reaction product is usually obtained as a precipitate from the reaction solution. If no precipitate is formed, the product may be separated and purified with ease according to a commonly practiced method such as column chromatography, paper chromatography, and the like, or else, the product may be obtained as a crystalline material by neutralizing and concentrating the reaction solution and treating it with a suitable solvent.

The process of the invention is excellent in that the end product can be obtained with simple procedures in good yield.

The starting 2-thioadenosine may be prepared, for example, by reacting 2-chloroadenosine with an acidic alkali metal salt of $H_2S$ as described in Japanese Pat. application No. 86,773/71.

2-Thioadenosines of the present invention are useful as a coronary vasodilator and an aggregation inhibitor for blood platelets and, as to the pharmacological activities, reference can be made to the following literatures: M. H. Maguire et al, "Journal of Medicinal Chemistry," Vol. 14, page 415, 1971, J. A. Argus et al, "British Journal of Pharmacology," Vol. 41, page 592, 1971, R. Einstein et al, "European Journal of Pharmacology," Vol. 19, page 246, 1972, G. V. R. Born et al, "Nature," Vol. 205, page 678, 1965, F. Michael et al, "Nature," Vol. 222, page 1073, 1969, and M. A. Packham et al, "American Journal of Physiology," Vol. 223, page 419, 1972.

The present invention will now be described in greater detail by the following examples of preferred embodiments of the invention, but they are not to be construed as limiting the scope of this invention.

REFERENCE EXAMPLE 1

2.0 g of 2-chloroadenosine was dissolved in a solution of 20 ml of anhydrous hydrogen sulfide and 1.5 g of sodium metal in 80 ml of dimethylformamide followed by reacting under anhydrous condition at a temperature of 80°C for 5 hours. The resulting reaction mixture was diluted with 80 ml of water, and made neutral with acetic acid. The mixture was then concentrated and dissolved in 75 ml of a mixture of n-butanol and water (2:1), and 25 ml of acetic acid was added thereto. The crystals formed upon allowing to stand were filtered to obtain 2.1 g (100% yield) of 2-thioadenosine. A pure product was obtained by dissolving the above 2-thioadenosine product in diluted aqueous ammonia and adjusting the pH of the solution with acetic acid to 4.

Melting Point: 196–199°C (with decomposition)
UV: λ(pH 1)           238.5    mμ    ($\epsilon$:13800)
                      293      mμ    ($\epsilon$:18400)
     λmax (pH 3.2)    239      mμ    ($\epsilon$:19300)
     λmax (pH 13)     243      mμ    ($\epsilon$:19100)
                      283      mμ    ($\epsilon$:14000)
     λmin (pH 1)      220.5    mμ    ($\epsilon$: 9400)
                      256.5    mμ    ($\epsilon$: 2800)
     λmin (pH 3.2)    251.5    mμ    ($\epsilon$: 3100)
     λmin (pH 13)     227      mμ    ($\epsilon$:12500)
                      259      mμ    ($\epsilon$: 7100)
pKa: 7.8
Specific rotation: $[\alpha]D^{25}$ = –43.6° (C:0.5, dimethylformamide)
Elementary Analysis:
   Calcd. for $C_{10}H_{13}O_4N_5S \cdot H_2O$:
              C, 37.89; H, 4.77; N, 22.09; S, 10.12%
   Found:     C, 37.67; H, 4.88; N, 21.82; S, 10.22%

The nuclear magnetic resonance spectrum of the product was fully consistent with its structure.

EXAMPLE 1

2-Benzylthioadenosine 100 mg of 2-thioadenosine was dissolved in 1.26 ml of water containing 0.315 m mole of sodium hydroxide, and 54.0 mg (0.315 m mole) of benzyl bromide was added thereto and the mixture was stirred overnight at room temperature to react. The precipitate formed was filtered and recrystallized from water-ethanol to obtain 99.7 mg (68% yield) of the desired product having a melting point of 151 – 155°C.

Rf value in paper chromatography:                               0.73
(solvent; n-butanol:water, 84:16)
UV:   λmax (pH 1)     272.5   mμ ($\epsilon$:16400)
      λmax (pH 7)     235     mμ ($\epsilon$:23900)
                      278     mμ ($\epsilon$:15900)
      λmax (pH 13)    234     mμ ($\epsilon$:24600)
                      278     mμ ($\epsilon$:15900)
Elementary Analysis:
   Calcd. for $C_{17}H_{19}O_4N_5S \cdot \frac{1}{2}H_2O \cdot \frac{1}{2}C_2H_5OH$:
              C, 51.29; H, 5.49; N, 16.61; S, 7.60%
   Found:     C, 51.28; H, 5.66; N, 16.81; S, 7.25%

EXAMPLE 2

2-p-Chlorobenzylthioadenosine 100 mg (0.315 m mole) of 2-thioadenosine was dissolved in 1.26 ml of water containing 0.315 m mole of sodium hydroxide, and 50.7 mg (0.315 m mole) of p-chlorobenzyl chloride was added thereto and stirred overnight at room temperature to react. The precipitate formed was filtered and recrystallized from water-ethanol to obtain 89 mg (64% yield) of the desired product having a melting point of 209° – 210°C.

Rf value in paper chromatography:                               0.79
(solvent; n-butanol:water, 84:16)
UV:   λmax (pH 1)     272     mμ ($\epsilon$:16400)
      λmax (pH 7)     233.5   mμ ($\epsilon$:28800)
                      278     mμ ($\epsilon$:16400)
      λmax (pH 13)    278     mμ ($\epsilon$:15800)
Elementary Analysis:
   Calcd. for $C_{17}H_{18}O_4N_5SCl \cdot \frac{1}{2}C_2H_5OH$:
              C, 48.30; H, 4.58; N, 15.94; S, 7.30%
   Found:     C, 48.00; H, 4.79; N, 15.79; S, 7.12%

EXAMPLE 3

2-p-Nitrobenzylthioadenosine 200 mg (0.630 m mole) of 2-thioadenosine was dissolved in 2.7 ml of water containing 0.7 m mole of sodium hydroxide. To this was added 163 mg (0.7 m mole) of p-nitrobenzyl bromide and, after heating at 70°C for 10 minutes, the solution was stirred at room temperature overnight to react. The precipitate formed was filtered, washed with chloroform and recrystallized from water-ethanol to obtain 211 mg (72% yield) of the desired product having a melting point of 131° – 132°C.

Rf value in paper chromatography:
(solvent; n-butanol:water, 84:16)                               0.67
(solvent; n-butanol:acetic acid:
water, 2:1:1)                                                   0.82
UV:   λmax (pH 1)     272 mμ    ($\epsilon$:21800)
      λmax (pH 7)     233 mμ    ($\epsilon$:24700)

-Continued

```
                277 mμ    (ε:23800)
λmax (pH 13)    233 mμ    (ε:23300)
                278 mμ    (ε:22300)
Elementary Analysis:
Calcd. for   C₁₇H₁₈O₄S·½H₂O·½C₂H₅OH:
             C, 46.34; H, 4.75; N, 18.01%
Found:       C, 46.34; H, 4.72; N, 17.94%
```

EXAMPLE 4

2-Allylthioadenosine 100 mg (0.315 m mole) of 2-thioadenosine was dissolved in 1.26 ml of water containing 0.315 m mole of sodium hydroxide, and 38 ml (0.315 m mole) of allyl bromide was added thereto and the mixture was stirred overnight at room temperature. The precipitate thus formed was filtered and recrystallized from ethanol to obtain 90 mg (76% yield) of the desired product having a melting point of 161° – 163°C.

```
Rf value in paper chromatography:
(solvent: n-butanol:water, 84:16)          0.61
UV:   λmax (pH 1)    272 mμ    (ε:16100)
      λmax (pH 7)    235 mμ    (ε:21400)
                    278 mμ    (ε:15000)
      λmax (pH 13)   234 mμ    (ε:21700)
                    278 mμ    (ε:14900)
Elementary Analysis:
Calcd. for    C₁₃H₁₇O₄N₅S·¾C₂H₅OH:
              C, 46.57; H, 5.79; N, 18.73; S, 8.57%
Found:        C, 46.26; H, 6.08; N, 18.79; S, 8.15%
```

EXAMPLE 5

2-Diethylaminoethylthioadenosine hydrochloride 100 mg (0.135 m mole) of 2-thioadenosine was dissolved in 1.26 ml of water containing 0.630 m mole of sodium hydroxide, and 54.2 mg (0.315 m mole) of diethylaminoethyl chloride hydrochloride was added thereto and the mixture was stirred overnight at room temperature to react. Thereafter, the reaction solution was neutralized with hydrochloric acid and a preparative paper chromatography was conducted followed by extracting the spot of the product. Then, the extract was passed through Dowex 1 (Cl⁻) column and the desired product was crystallized from isopropanol. Recrystallization from ethanol yield 66 mg (50.0% in yield) of the desired product having a melting point of 217° – 218°C (d).

```
Rf value in paper chromatography:
(solvent: n-butanol:water, 84:16)           0.18
(solvent: n-butanol:acetic acid:
 water, 2:1:1)                              0.62
UV:   λmax (pH 1)    270.5   mμ (ε:15400)
      λmax (pH 7)    232     mμ (ε:24200)
                     275     mμ (ε:15800)
      λmax (pH 13)   235     mμ (ε:21500)
                     278     mμ (ε:15400)
Elementary Analysis:
Calcd. for    C₁₄H₂₄O₄N₆S·HCl
              C, 44.18; H, 6.25; N, 19.32%
Found:        C, 44.28; H, 6.21; N, 19.58%
```

EXAMPLE 6

2-(trans-Crotyl)thioadenosine 200 mg (0.63 m mole) of 2-thioadenosine was dissolved in 2.52 ml (0.63 m mole) of 0.25N NaOH, and 57 mg (0.63 m mole) of trans-1-chloro-2-butene was added thereto and the mixture was stirred overnight at room temperature. The precipitate formed was recrystallized from water to obtain 141.5 mg (64% yield) of desired product. m.p. 90° – 93°C.

```
UV:   λmax (pH 1)    272 mμ
      λmax (pH 7)    235, 278 mμ
      λmax (pH 13)   234, 278 mμ
Elementary Analysis:
Calcd. for   C₁₄H₁₉O₄N₅S:     C, 47.58; H, 5.42; N, 19.82%
Found:                        C, 47.42; H, 5.36; N, 19.91%
```

EXAMPLE 7

2-(β-Methally)thioadenosine 200 mg (0.63 m mole) of 2-thioadenosine was dissolved in 2.52 ml (0.63 m mole) of 0.25N NaOH, and 57 mg (0.63 m mole) of β-methally chloride was added thereto. Then, 5.0 ml of ethanol was added thereto and the mixture was stirred overnight at room temperature to react. After concentrating the reaction solution, the resulting residue was washed with petroleum ether and crystallized from water. Recrystallization from water yielded 159.3 mg (70.0% in yield) of the desired product m.p. 116°–121°C.

```
UV:   λmax (pH 1)    272 mμ
      λmax (pH 7)    235, 278 mμ
      λmax (pH 13)   234, 278 mμ
Elementary Analysis:
Calcd. for C₁₄H₁₉O₄N₅S:       C, 47.58; H, 5.42; N, 19.82%
Found                         C, 47.45; H, 5.44; N, 19.95%
```

EXAMPLE 8

2-Methylthioadenosine 100 mg (0.315 m mole) of 2-thioadenosine was dissolved in 1.26 ml of water containing 0.315 m mole of sodium hydroxide, and 44.7 mg (0.315 m mole) of methyl iodide was added thereto. The mixture was then stirred for 30 minutes at room temperature, and the precipitated formed was filtered and recrystallized from water to give 86 mg (85% yield) of the desired product m.p., 228°–229.5°C.

```
Rf value in paper chromatography:
(solvent: n-butanol:water, 84:16)          0.43
UV:   λmax (pH 1)    270 mμ (ε:17300)
      λmax (pH 7)    235 mμ (ε:22300)
                    277 mμ (ε:15600)
      λmax (pH 13)  234.5 mμ (ε:22300)
                    277 mμ (ε:15400)
Elementary Analysis:
Calcd. for   C₁₁H₁₅O₄N₅S·½H₂O:
             C, 40.99; H, 4.96; N, 21.73; S, 9.93%
Found:       C, 40.77; H, 4.86; N, 21.71; S, 9.81%
```

EXAMPLE 9

2-n-Propylthioadenosine 100 mg of 2-thioadensine was dissolved in 1.26 ml of water containing 0.315 m mole of sodium hydroxide, and 39 mg (0.315 m mole) of n-propyl bromide was added thereto. The mixture was then stirred overnight at room temperature to react. The precipitate formed was filtered and recrystallized from water to given 100 mg (77% yield) of the desired product m.p., 168°–170°C.

| Rf value in paper chromatography: (solvent: n-butanol:water, 84:16) | | 0.75 | |
|---|---|---|---|
| UV: | λmax (pH 1) | 269 mμ | (ε:17500) |
| | λmax (pH 7) | 235 mμ | (ε:22000) |
| | | 275 mμ | (ε:14000) |
| | λmax (pH 13) | 235 mμ | (ε:22100) |
| | | 275 mμ | (ε:13900) |
| Elementary Analysis: | | | |
| Calcd. for $C_{19}H_{19}N_5O_4S$: | | C, 52.77; H, 4.91; N, 17.06% | |
| Found: | | C, 52.47; H, 4.95; N, 16.78% | |

The S-substituted-2-thioadenosines, obtained by the present invention, showed 30 – 100% inhibition of adenosine-5'-diphosphate($10^{-5}$M)-induced aggregation or of collagen-induced aggregation of blood platelets suspension of rabbit and human (measured according to the method of Born and Cross, described in "Journal of Physiology," Vol. 168, page 178, 1963) at a level of $10^{-4}$M as shown in the following examples in the Table.

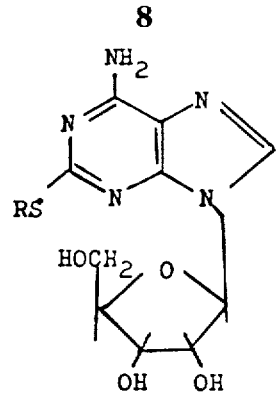

wherein R is selected from the group consisting of an allyl group, a β or γ-methallyl group, a benzyl group, a p-nitro or p-chlorobenzyl group and a diethylaminoethyl group.

2. The compound of claim 1 which is 2-Benzylthioadenosine.

3. The compound of claim 1 which is 2-(p-Chlorobenzyl)-thioadenosine.

4. The compound of claim 1 which is 2-(p-Nitrobenzyl)thioadenosine.

| | Inhibition of Rabbit platelet Aggregation by S-Substituted-2-thioadenosines | | | |
|---|---|---|---|---|
| Compound | Inhibition of ADP-induced aggregation | | Inhibition of collagen-induced aggregation | |
| | $10^{-4}$ M | $10^{-5}$ M | $10^{-4}$ M | $10^{-5}$ M |
| 2-Benzylthioadenosine | 85% | 36% | 92% | 26% |
| 2-(p-Chlorobenzyl)-thioadenosine | 86 | 0 | 88 | 31 |
| 2-(p-Nitrobenzyl)-thioadenosine | 88 | 0 | 95 | 30 |
| 2-Allylthioadenosine | 77 | 23 | 62 | 0 |
| 2-(trans-Crotyl)thio-adenosine | 58 | 29 | 80 | 30 |
| 2-(β-Methallyl)thio-adenosine | 84 | 32 | 97 | 28 |
| 2-Diethylaminoethyl-thioadenosine | 33 | | 86 | |

While the invention has been described in detail and with reference to specific embodiments thereof, it will be apparent to one skilled in the art that various changes and modifications can be made therein without departing from the spirit and scope thereof.

What is claimed is:

1. S-substituted-2-thioadenosine represented by the following general formula:

5. The compound of claim 1 which is 2-Allylthioadenosine.

6. The compound of claim 1 which is 2-(trans-Crotyl)-thioadenosine.

7. The compound of claim 1 which is 2-(β-Methallyl)thioadenosine.

8. The compound of claim 1 which is 2-Diethylaminoethylthioadenosine.

* * * * *